United States Patent
Ronchi et al.

(10) Patent No.: US 9,255,617 B2
(45) Date of Patent: Feb. 9, 2016

(54) DISC FOR A DISC BRAKE OF THE VENTILATED TYPE

(75) Inventors: Nino Ronchi, Bergamo (IT); Leone Oberti, Bergamo (IT)

(73) Assignee: FRENI BREMBO S.P.A., Bergamo (IT)

( * ) Notice: Subject to any disclaimer, the term of this patent is extended or adjusted under 35 U.S.C. 154(b) by 53 days.

(21) Appl. No.: 14/117,432

(22) PCT Filed: May 25, 2012

(86) PCT No.: PCT/IB2012/052634
§ 371 (c)(1),
(2), (4) Date: Feb. 4, 2014

(87) PCT Pub. No.: WO2012/164465
PCT Pub. Date: Dec. 6, 2012

(65) Prior Publication Data
US 2014/0151167 A1    Jun. 5, 2014

(30) Foreign Application Priority Data

May 27, 2011   (IT) .............................. MI2011A0964

(51) Int. Cl.
*F16D 65/12* (2006.01)
*F16D 65/00* (2006.01)
*F16D 65/02* (2006.01)

(52) U.S. Cl.
CPC .......... *F16D 65/128* (2013.01); *F16D 65/0006* (2013.01); *F16D 2065/1328* (2013.01)

(58) Field of Classification Search
CPC ... F16D 65/128; F16D 65/006; F16D 65/827; F16D 65/847
USPC .... 188/218 XL, 18 A, 264 A, 264 R, 264 AA
See application file for complete search history.

(56) References Cited

U.S. PATENT DOCUMENTS

| 3,983,973 A | 10/1976 | Zboralski et al. |
| 5,542,503 A * | 8/1996 | Dunn et al. ................. 188/18 A |
| 2004/0163902 A1 | 8/2004 | Meroni et al. |
| 2006/0243546 A1* | 11/2006 | Oberti et al. ............ 188/218 XL |

(Continued)

FOREIGN PATENT DOCUMENTS

| DE | 102004056645 A1 | 6/2006 |
| DE | 202006017092 U1 | 1/2007 |

(Continued)

OTHER PUBLICATIONS

The International Search Report and Written Opinion dated Sep. 11, 2012.

(Continued)

*Primary Examiner* — Melanie Torres Williams
(74) *Attorney, Agent, or Firm* — Thomas Horstemeyer, LLP

(57) ABSTRACT

A disc for a disc brake of the ventilated type comprising a braking band (2) defined by two plates (3, 4), which are co-axial to an axis, which are mutually facing and spaced to provide an interspace. The plates have facing surfaces (6, 7) from which elements (8, 9, 10) for the connection of the same plates transversally extend. Such facing surfaces define, together with the connecting elements, inside the interspace, ventilation ducts in order to cool the disc. The disc (1) comprises a plurality of projections (11, 12) protruding from both facing surfaces of the two plates (3, 4). The projections are circumferentially arranged only in proximity of the outer edges of the plates in correspondence of the outlet of the ventilation ducts. Each projection (11) of a plate (3) is opposed to and aligned with a projection (12) of the other plate (4) along a direction parallel to the axis.

15 Claims, 9 Drawing Sheets

(56) References Cited

U.S. PATENT DOCUMENTS

2011/0127125 A1* 6/2011 Finch et al. ............. 188/218 XL
2013/0284547 A1* 10/2013 Pipilis et al. ............ 188/218 XL

FOREIGN PATENT DOCUMENTS

| DE | 102010026070 A1 * | 1/2011 | |
| DE | 102012024298 A1 * | 12/2013 | ............ F16D 65/128 |
| EP | 2192321 A1 | 6/2010 | |
| WO | 2008078352 A1 | 7/2008 | |

OTHER PUBLICATIONS

The Italian Search Report dated Dec. 14, 2011.

* cited by examiner

DISC FOR A DISC BRAKE OF THE VENTILATED TYPE

CROSS-REFERENCE TO RELATED APPLICATION

This application is the 35 U.S.C. §371 national stage of PCT application PCT/IB2012/052634, filed May 25, 2012 which claims priority to Italian Patent Application No. MI2011A000964, dated May 27, 2011, both of which are incorporated by reference in their entirety.

APPLICATION FIELD

It is the object of the present invention a disc for a disc brake of the ventilated type.

The disc for a disc brake according to the present invention finds application particularly, but not exclusively, in the automotive industry, especially on heavy motor vehicles, such as for example SUVs or large-sized MPVs.

STATE OF THE ART

As it is known, the discs for a disc brake comprise a bell from which a ring portion, referred to as a braking band, extends, which is intended to cooperate with pads of a caliper. In the case of the discs of the ventilated type, the braking band is made of two plates, which are mutually facing and connected together by connecting elements, for example, in the form of pins or wings. The external surfaces of the two plates define opposite braking surfaces, while the internal surfaces define, together with the pins or wings, ventilation ducts to cool the disc, which are passed through by the air according to a centrifugal direction during the rotational motion of the same disc.

It is known that, under certain stress conditions, the brake discs, and in particular the braking bands, generate annoying noises and whistles, which may also be very intense. This phenomenon occurs when the braking band is excited at frequencies that are near or equal to the intrinsic vibration modes. In fact, when a body is excited in the vicinity of the intrinsic vibration modes, the known resonance phenomenon occurs. If the frequency of such vibration falls within the range of frequencies audible to a human being, such vibrations generate annoying whistles, which are audible within the vehicle interior, to the detriment of the comfort and the perceived quality of the vehicle.

In the patent GB 2,286,438, in the name of the same Applicant, is disclosed a brake disc of the ventilated type with such a braking band as to increase the rigidity of the structure, thereby increasing the frequencies of the diametrical vibration modes of the braking band. In more detail, the two plates of the braking band are interconnected by radial wings. The structure is diametrically stiffened by thickening the outermost radial end of one out of two wings by means of a drop-shaped mass that is arranged at the connecting area of the wing itself with one of the two plates. On the other plate, in the proximity of the band outer edge, projections suitable to equilibrate the weight of the drop-shaped stiffening masses are arranged. Such projections are arranged at the outlet of the ventilation ducts that are not affected by the stiffening masses, so as not to create ventilation ducts with an excessively reduced opening. The described solution allows only partially increasing the frequencies of the intrinsic diametrical vibration modes of the disc. Therefore, the reduction of the resonance phenomenon in the range of the audible frequencies is limited.

In the patent U.S. Pat. No. 3,983,973, a brake disc of the ventilated type is disclosed, which is provided with inserts of a material having vibration dampening capabilities, arranged on the internal surfaces of both plates. The inserts are arranged at the ventilation ducts within special grooves, and radially extend substantially throughout the length of the ducts. The solution is not particularly efficient, and it is anyway constructively complex to be manufactured, and therefore it is not cost-effective.

In the patent U.S. Pat. No. 3,425,523, a brake disc of the ventilated type is disclosed, which is provided with vibration dampening elements that are removably inserted into one or more ventilation ducts. Such dampening elements are elastic bodies made of an elastic cable, which is suitably shaped to contact both plates.

Neither this solution is particularly efficient, and it is anyway operatively impractical.

DISCLOSURE OF THE INVENTION

Therefore, the object of the present invention is to eliminate, or at least reduce, the above-mentioned problems relative to the prior art, by a disc for a disc brake of the ventilated type, which allows significantly reducing the occurrence of vibration-associated noises and whistles.

In accordance with the preferred embodiment, such problems are solved by a disc for a disc brake of the ventilated type, comprising a braking band, which is defined by two plates co-axial to an axis, which are mutually facing and spaced to provide an interspace; said plates have facing surfaces from which elements transversally extend to connect the same plates, such facing surfaces defining, together with the connecting elements, inside said interspace, ventilation ducts in order to cool the disc, such disc comprises a plurality of projections protruding from both facing surfaces of the two plates, said projections are circumferentially arranged in proximity of the outer edges of the plates in correspondence of the outlet of the ventilation ducts, each projection of a plate is opposed to and aligned with a projection of the other plate along a direction parallel to said symmetry axis.

Preferably, said projections (11, 12) are evenly arranged only along the outer edges of the plates.

Advantageously, said projections are arranged at the outlet of each ventilation duct.

Preferably, said projections have a circular section relative to a plane orthogonal to the axis.

In a particular embodiment, said connecting elements consist of wings.

Advantageously, said wings have a radial development relative to said axis.

Alternatively, said connecting elements consist of columnar elements.

Advantageously, said columnar elements are arranged along at least one outer row and an inner row, which are concentric relative to each other and to the plates.

Preferably, the columnar elements of the outer row have a substantially circular section relative to a plane orthogonal to said axis.

Advantageously, each projection is arranged between two columnar elements of the outer row.

Preferably, the projections of a plate are in equal number as that of the columnar elements of the outer row.

Advantageously, the columnar elements of the inner row have a rhomboidal-shaped section relative to a plane orthogonal to said axis.

Advantageously, at least one further intermediate row of columnar elements is provided.

Preferably, the columnar elements of the intermediate row have a rhomboidal-shaped section relative to a plane orthogonal to said axis.

Alternatively, the columnar elements of the intermediate row have a star-shaped section relative to a plane orthogonal to said axis.

Advantageously, the columnar elements of the intermediate row are offset relative to those of the outer row and the inner row.

Preferably, said projections are radially aligned with the columnar elements of the intermediate row.

Advantageously, the columnar elements are arranged between the two plates according to a quincuncial arrangement.

Preferably, said projections are made from the same material as the plates.

Preferably, said projections are made integral to the plates.

DESCRIPTION OF THE DRAWINGS

The technical features of the invention are clearly apparent from the content of the claims set forth below, and the advantages thereof will be more clear in the following detailed description, given with reference to the annexed drawings, which represent one or more merely exemplary, non-limiting embodiments thereof, in which:

DETAILED DESCRIPTION

Figure 1:
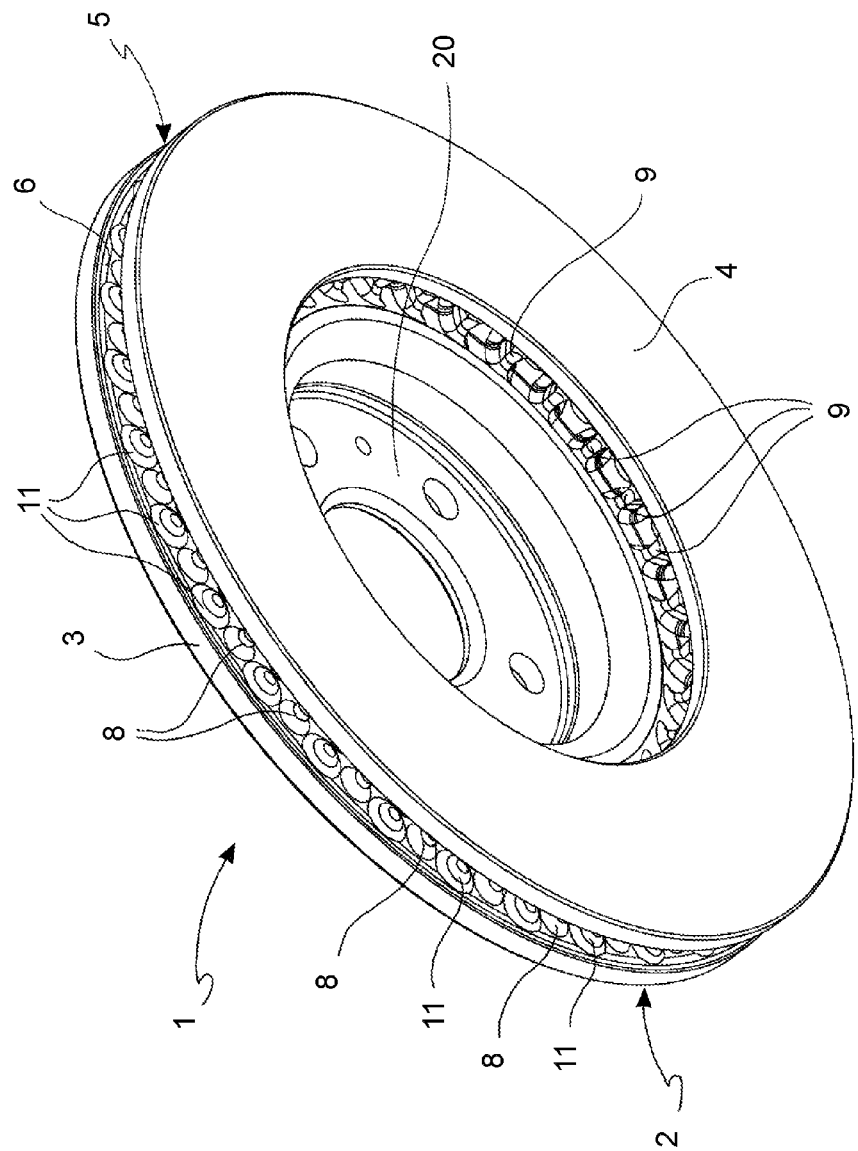
FIG. 1 shows a perspective view of a disc for a disc brake of the ventilated type according to a preferred embodiment of the invention, seen from the side opposite to the supporting bell side.
Figure 2:
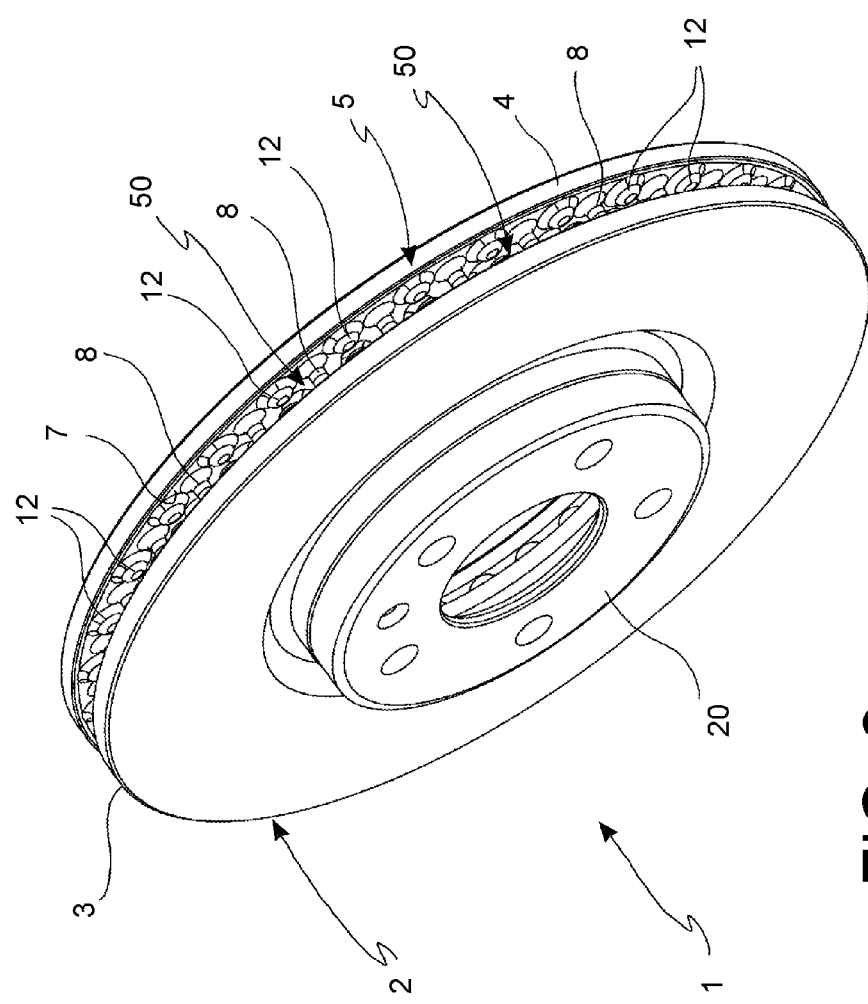
FIG. 2 shows a perspective view of the disc of FIG. 1, seen from the bell side.
Figure 3:
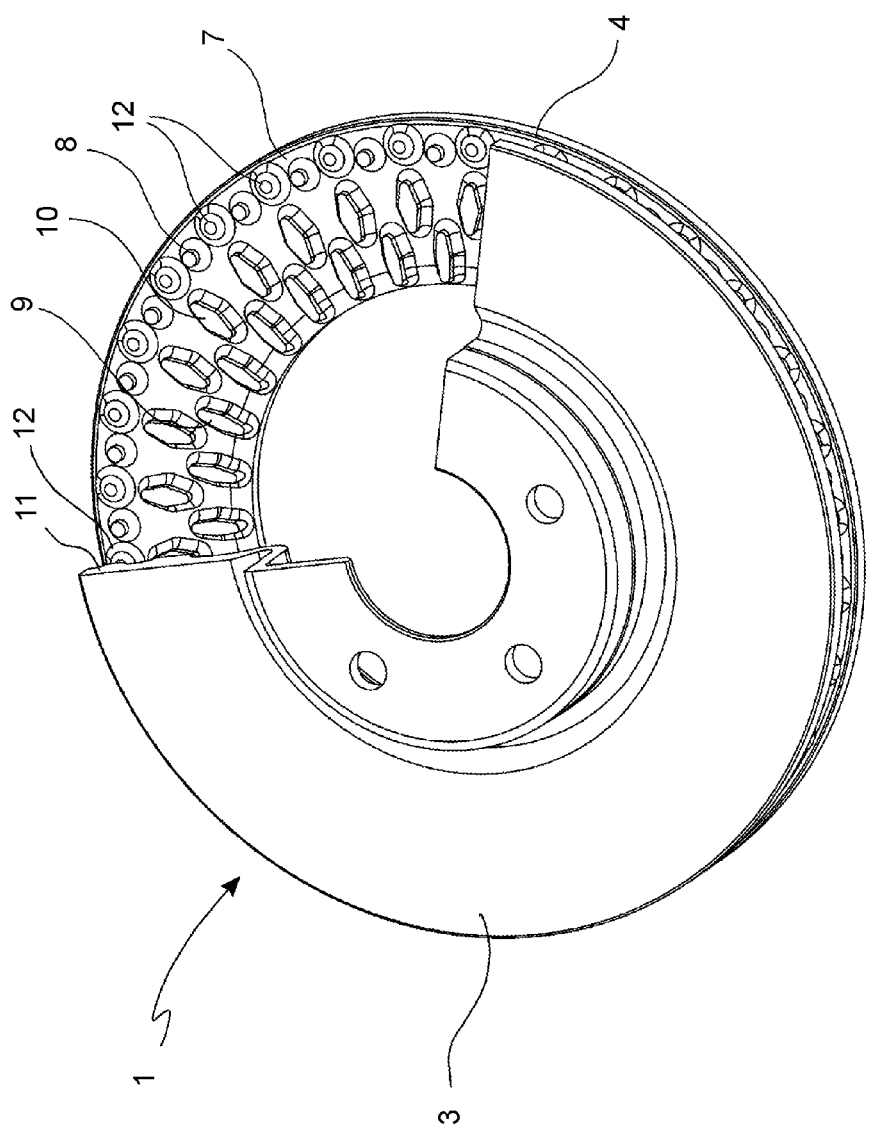
FIG. 3 shows a perspective view of the disc illustrated in FIG. 1, with the plate of the bell side partially sectioned.
Figure 4:
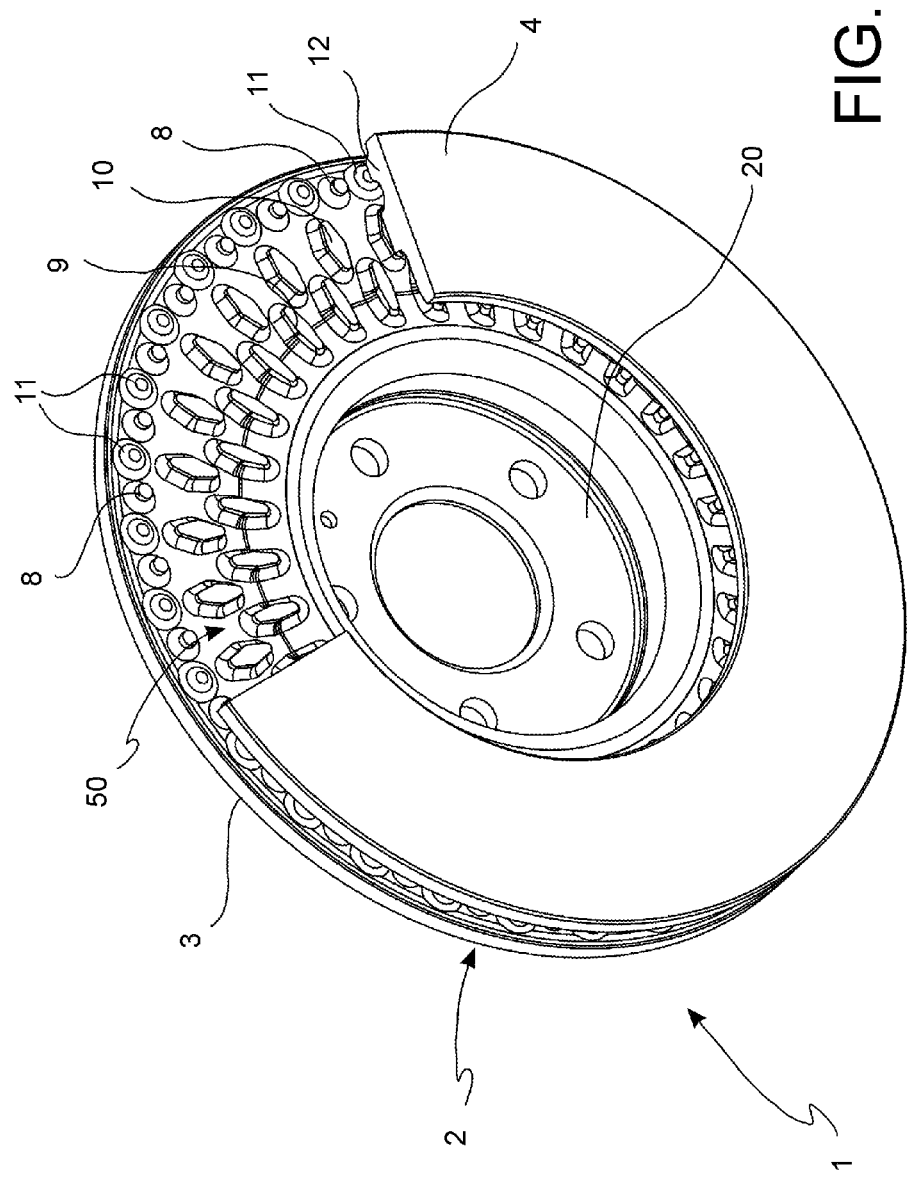
FIG. 4 shows a perspective view of the disc illustrated in FIG. 1, with the plate of the side opposite the bell side partially sectioned.
Figure 5:
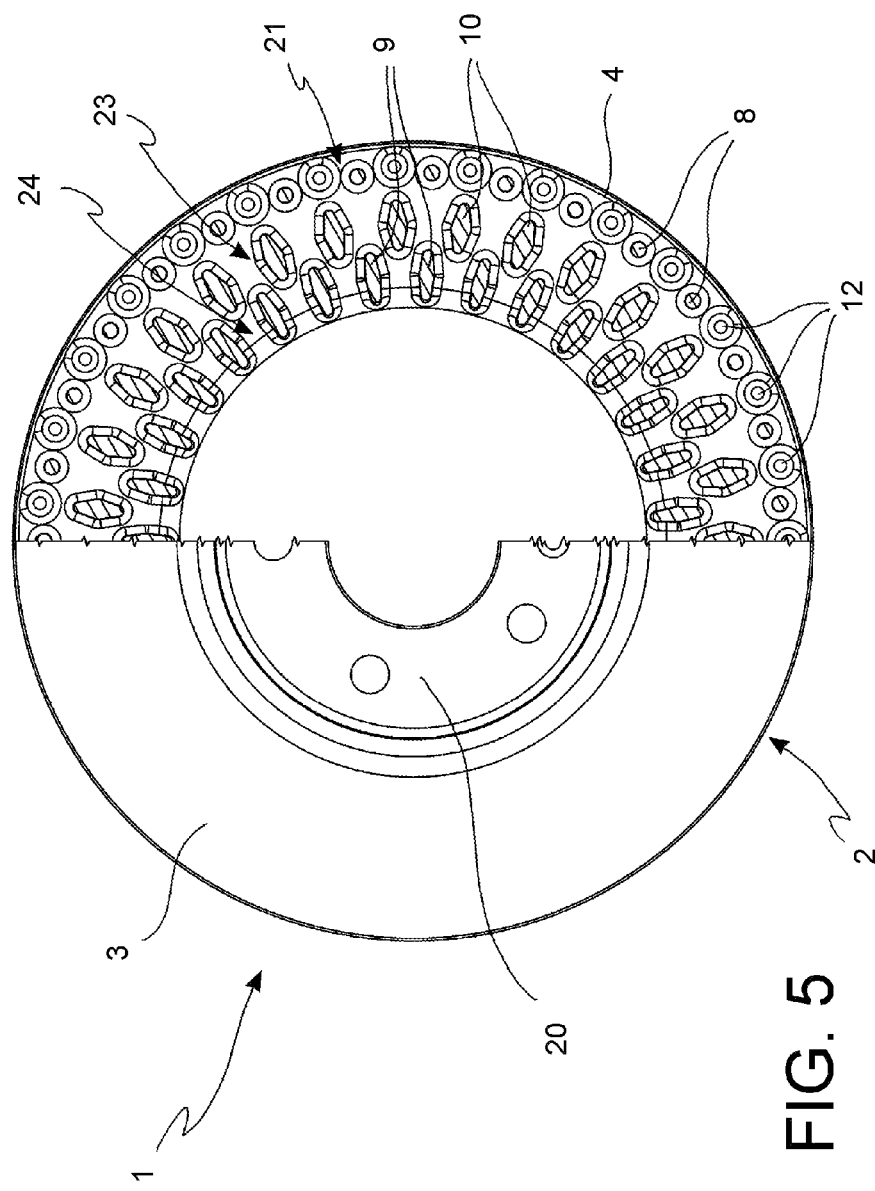
FIG. 5 shows a plan view of the disc illustrated in FIG. 1, seen from the bell side, with the plate partially sectioned.
Figure 6:
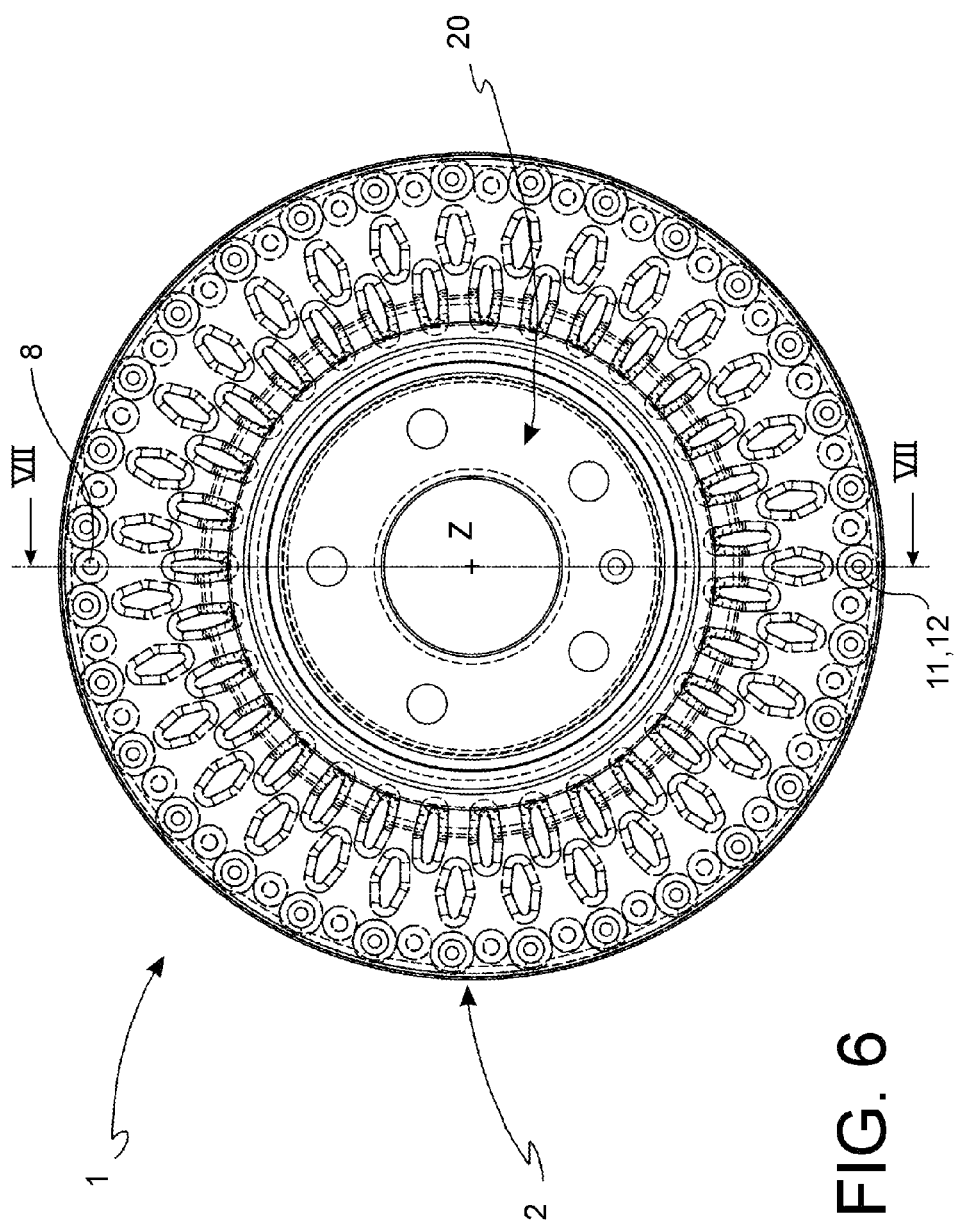
FIG. 6 shows a plan view of the disc illustrated in FIG. 1, with the plate of the bell side shown in phantom.

With reference to the drawings, a disc for a disc brake of the ventilated type according to the invention, intended to be used in a disc brake (not shown) of a vehicle, such as for example a motor vehicle, has been generally indicated by 1. The disc has a substantially circular configuration and extends around an axis indicated in the Figures with Z.

By a direction axial to the disc or the braking band, is meant a direction parallel to the axis Z. By direction radial to the disc or the braking band, is meant a direction perpendicular to the axial direction or the axis Z. Finally, by direction tangential or circumferential to the disc, is meant a direction coinciding with a circumference having its center on the axis Z.

The disc 1 comprises a supporting bell 20 and a braking band 2 coaxial relative to the bell 20.

The braking band 2, which is intended to cooperate with the calipers of the disc brake in order to exert the braking action on the vehicle, is defined by two plates 3, 4, which are coaxial to the axis Z. A first plate 3 is arranged at the supporting bell 20 side, while the second plate 4 is arranged at the opposite side.

The two plates are mutually facing and spaced to provide an interspace 5, which, during the rotation of the disc, houses an air flow according to a centrifugal direction during the rotational motion of the same disc.

The two plates 3, 4 having facing surfaces 6, 7 from which elements 8, 9, 10 for connecting the same plates 6, 7 are transversally extended.

The facing surfaces 6, 7 define, together with the connecting elements 8, 9, 10 within the above-mentioned interspace, ventilation ducts 50 in order to cool the disc, which are passed through by the air according to a centrifugal direction during the rotational motion of the same disc.

According to the invention, the disc 1 comprises a plurality of projections 11, 12 protruding from both facing surfaces 6, 7 of the two plates 3, 4. Such projections 11, 12 are circumferentially arranged in the proximity of the outer edges of the plates at the outlet of the ventilation ducts 50. Each projection 11 of a plate 3 is axially opposed to and aligned with a projection 12 of the other plate 4.

In other words, the projections 11, 12 are arranged on an outer annular band of the plates, and are arranged so that, to a projection on one plate, an axially opposite projection corresponds on the other plate.

Preferably, such projections 11, 12 are arranged only on said annular band. Advantageously, such projections 11, 12 are circumferentially arranged in the proximity of the outer edges of the plates at the outlet of the ventilation ducts 50.

Figure 7:
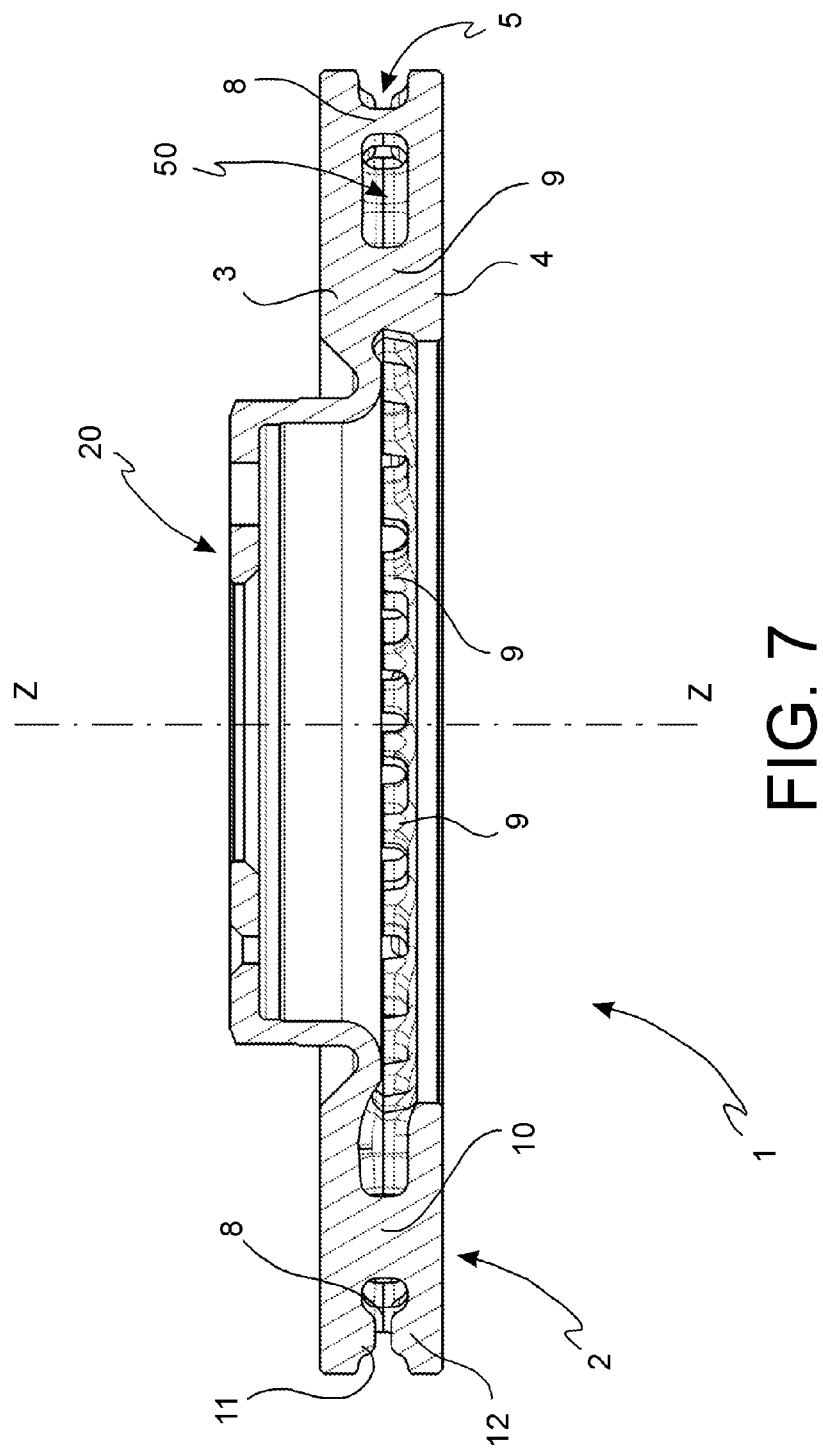
FIG. 7 shows a sectional side view of the disc illustrated in FIG. 6 according to the line VII-VII set forth therein.

The projections 11, 12 consist of simple appendixes protruding from the corresponding plates. The projections 11, 12 of a plate are separated from the axially opposing projections arranged on the other plate (as illustrated, for example, in FIG. 7).

Functionally, the projections 11, 12 define dampening masses arranged externally to the braking band and allow changing the intrinsic diametrical vibration modes of the disc 1, i.e., its intrinsic frequencies, however without changing the disc strength, and above all without changing its rigidity. Such projections affect the relationship governing the response $\omega p = \sqrt{k/m}$, and therefore the value of the intrinsic frequencies of the disc, where k indicates the elastic constant, and m indicates the mass.

The projections 11, 12 increase the value of m, without substantially affecting the value k, not appreciably intervening on the rigidity of the braking band.

By means of such projections 11, 12, and by virtue of the distribution thereof, it is possible to intervene on the intrinsic diametrical modes of the disc, decreasing the intrinsic frequencies, which can be excited mostly during the running of a vehicle, so as to reduce, or try to completely eliminate, the occurrence of annoying vibration or resonance phenomena.

Preferably, the projections 11, 12 are evenly arranged along the outer edges of the plates 6, 7, in order to avoid dynamic imbalances during the disc rotation.

Figure 8:
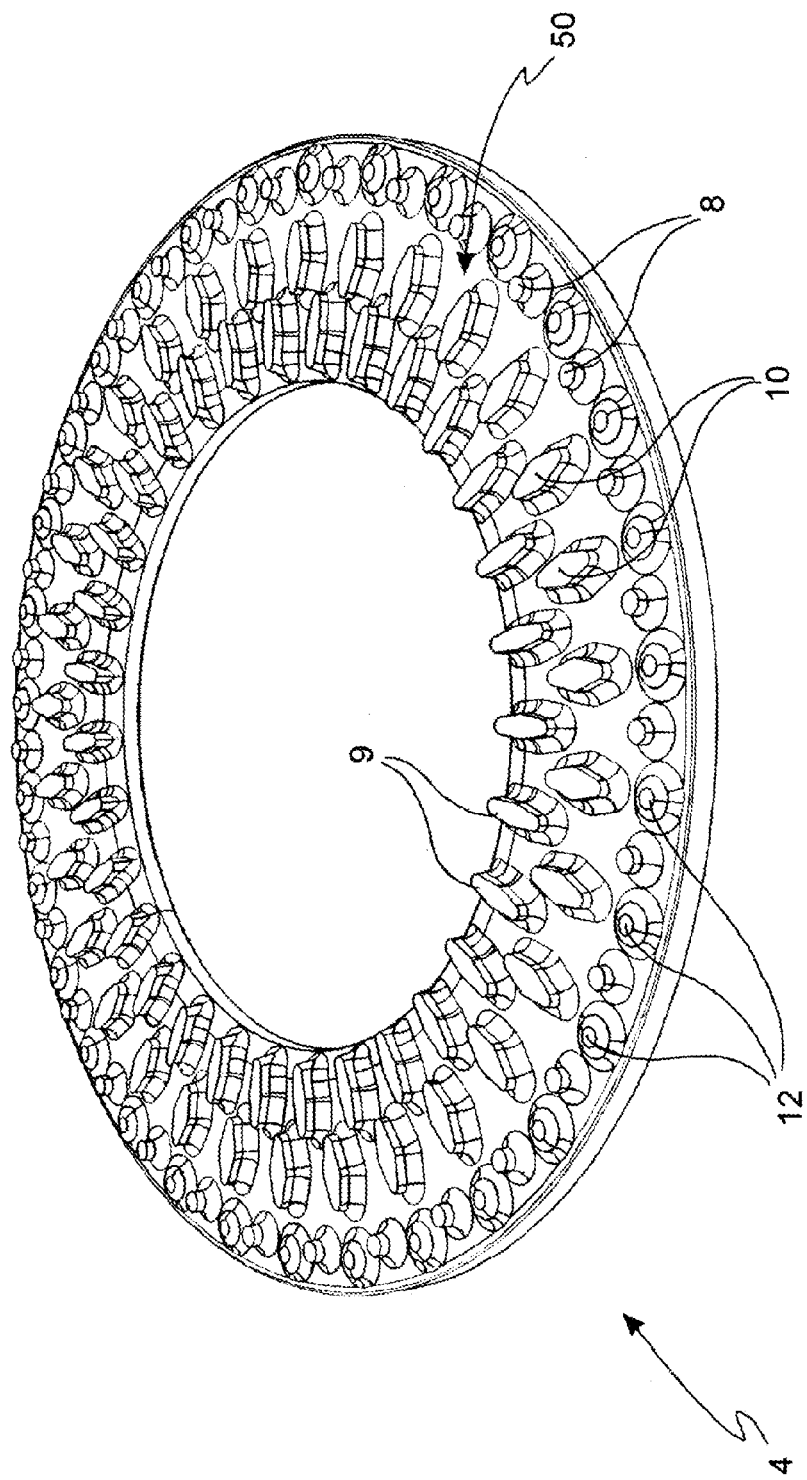
FIG. 8 shows a sectional perspective view of the disc illustrated in FIG. 1 with the bell side plate and the supporting bell completely removed in order to better highlight the internal structure of the braking band at the interspace between the two plates.
Figure 9:
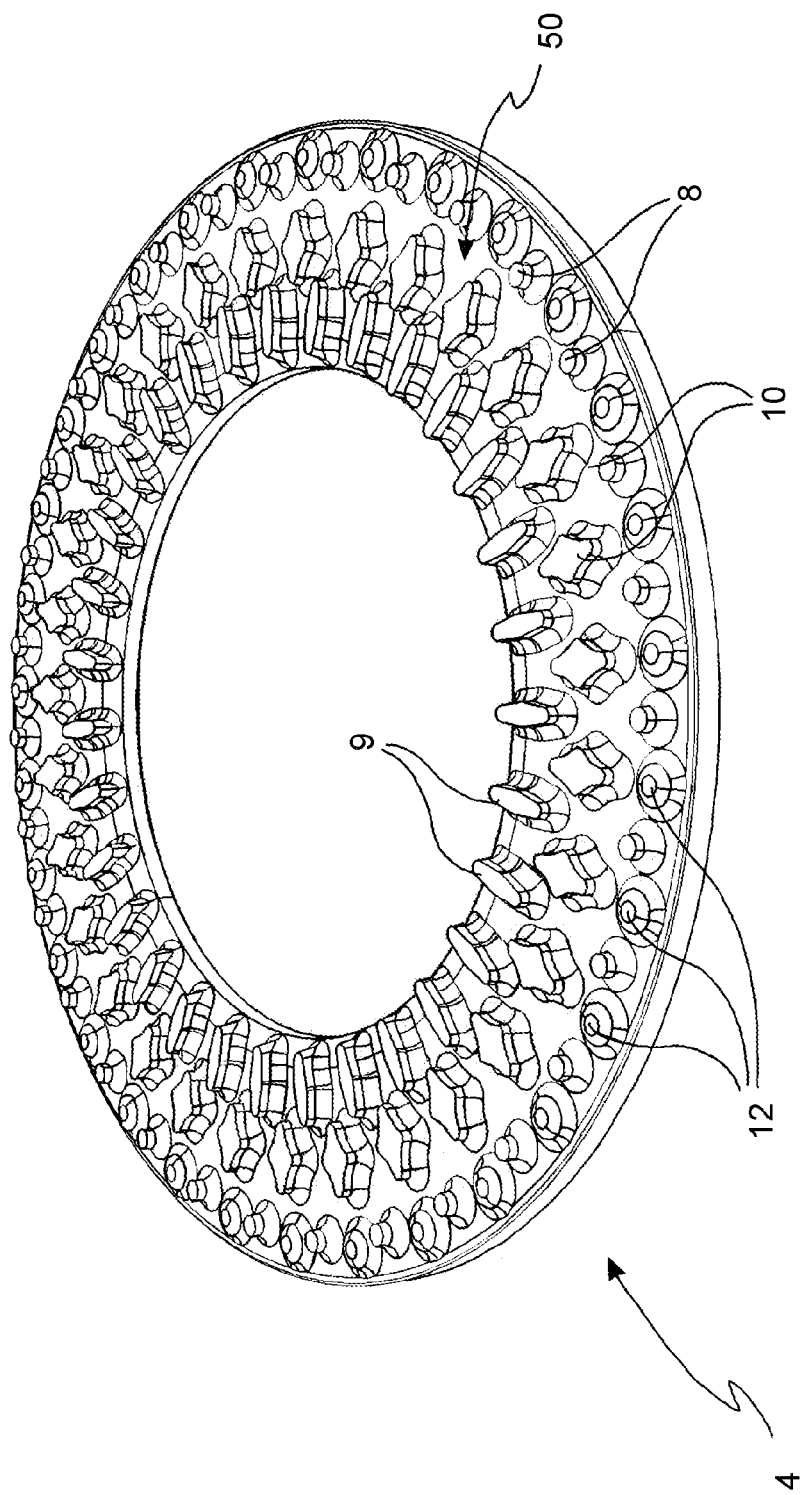
FIG. 9 shows a sectional perspective view of a disc for a disc brake of the ventilated type according to an alternative embodiment of the invention, with the bell side, plate and the supporting bell completely removed in order to better highlight the internal structure of the braking band at the interspace between the two plates.

In particular, the projections 11, 12 are arranged at the outlet of each ventilation duct 50, as illustrated for example in FIGS. 8 and 9.

In accordance with a preferred embodiment, the projections 11, 12 have a circular section relative to a plane orthogonal to the axis Z, in order to reduce the fluid dynamic impact on the air flows exiting the ventilation ducts.

Preferably, the projections 11, 12 have a cylindrical shape, with a rounded head and bevelled fitting at its base. The height and diameter of the projections 11, 12 may vary according to the uses, so as to calibrate the amount of the dampening mass, upon the desired frequency reduction.

Advantageously, the projections 11, 12 are made from the same material as the plates 3, 4 and are preferably made integral (in particular, by melting) with the plates themselves.

In accordance to an embodiment, which is not illustrated in the annexed Figures, the connecting elements between the two plates consist of wings. In particular, the wings can have a radial development.

In accordance with the embodiment illustrated in the annexed Figures, the connecting elements 8, 9, 10 between the plates 3, 4 consist of columnar elements. Advantageously, the columnar elements 8, 9, 10 are evenly arranged along the facing surfaces 6, 7 of the two plates 3, 4.

Preferably, the columnar elements are arranged along at least two circular crowns or concentric rows, corresponding to an outer row 21, that is, farther from the axis Z, and an inner row 22, that is, nearer to the axis Z.

In accordance with the described embodiments, the columnar elements 8, 9, and 10 are arranged on three circular crowns or concentric rows, corresponding to an outer row 21, an intermediate row 23, and an inner row 22.

Preferably, the columnar elements of the outer row 21, indicated with 8, have a substantially circular section relative to a plan orthogonal to the axis Z.

Advantageously, each projection 11, 12 is arranged between two columnar elements 8 of the outer row 21.

Preferably, the projections 11, 12 of a plate 3, 4 are in equal number as that of the columnar elements 8 of the outer row 21.

Preferably, the columnar elements 9 of the inner row 22 have, relative to a plan orthogonal to the axis Z, a tapered section both towards the axis Z of the plates, and outwardly to the braking band 2 to form a substantially rhomboidal section. Preferably, the sides of the rhomboidal section are mutually fitted.

In accordance with the embodiment illustrated in FIGS. 3 to 7, the columnar elements 10 of the intermediate row 23 have a rhomboidal section, similar to those of the outer row 21. Preferably, the elements 10 of the intermediate row 23 are larger than the elements 8 of the outer row 21 in the circumferential direction.

In accordance with the alternative embodiment illustrated in FIG. 9, the columnar elements 10 of the intermediate row 23 have a star-shaped section relative to a plan orthogonal to the axis Z.

The dimensions of the columnar elements 8, 9, and 10 can vary according to the vehicle to which the disc is intended.

As it can be noted, in particular from FIGS. 8 and 9, the columnar elements 10 of the intermediate row 23 are offset relative to those of the outer row 21 and the inner row 22.

In particular, the projections 11, 12 are radially aligned with the columnar elements 10 of the intermediate row 23.

Preferably, the columnar elements 8, 9, 10 are arranged between the two plates 3, 4 according to a quincuncial arrangement.

The use of connecting elements of the columnar type allows varying the number and dimensions of the columnar elements of each single row, so as to, achieve a custom configuration in terms of a compromise between implementation, fluid dynamics, and thermal crack strength.

Preferably, the projections 11 and 12 are coupled to columnar elements having a circular or round cross-section. In fact, experimentally, this solution gave the greatest advantages, in terms of a decrease of the disc intrinsic frequencies.

The round or circular shape allows finding a balance between rigidity and dampening, by simply varying the diameters of the projections and the columnar elements themselves to achieve a balance between the parts, with implementation easiness.

This would not be possible with connecting elements of the wing type, since the width of the entire wing should be varied, thus causing a weakening of the structure in the part that is most susceptible to thermal cracks (i.e., the center of the braking band).

A comparative modal analysis has been carried out, between a conventional brake disc of the ventilated type (indicated as a disc A herein below) and a brake disc according to the invention (indicated as a disc B herein below) in order to appreciate the shifting of the intrinsic frequencies of the disc by virtue of the invention.

The disc A has an outer diameter of 320 mm, an inner diameter of 189 mm, and a thickness of 30 mm. The ventilation chamber has a height in the axial direction of 11 mm. The disc A, made of cast iron, has a mass of 9.950 kg. The two plates of the disc are connected by columnar elements equal to each other (having a substantially rectangular shape), arranged on three concentric rows with a quincuncial arrangement. Each row has 51 columnar elements.

The disc B made according to the invention has an outer diameter of 320 mm, an inner diameter of 189 mm, and a thickness of 30 mm. The ventilation chamber has a height in the axial direction of 12 mm. The disc A, made of cast iron, has a mass of 9.602 kg. The two plates of the disc are connected by columnar elements arranged on three concentric rows with a quincuncial arrangement, as illustrated in the annexed FIG. 8. Each row has 31 columnar elements. The elements of the outer row have a circular cross-section, while the elements of the intermediate row and inner row have a substantially rhomboidal section. There are 31 projections for each plate, arranged in axially opposite pairs. The projections are arranged on the outer row between a columnar element and the other one.

Preferably, the projections have a height ranging between 2 and 15 mm, preferably 4 mm, and a diameter ranging between 2 and 15 mm, preferably 4 mm.

The modal analysis is of the "free-free" type, from 0 to 8000 Hz, and has been carried out by using the following parameters: Young's modulus E=111839 MPa; tangent modulus of elasticity G=44380.5 MPa; density $\rho$=7.106 kg/dm3.

In Table 1, the results for the modal analysis have been reported, with the values of the frequencies for the considered intrinsic modes of the disc A and the disc B. The variation $\Delta$ % has been calculated with reference to the disc A.

TABLE 1

|  | Disc A frequency [Hz] | Disc B frequency [Hz] | $\Delta$% |
|---|---|---|---|
| Mode I K(0; 2) | 908 | 805 | −11.3 |
| Mode II K(0; 3) | 2007 | 1844 | −8.1 |
| Mode III K(0; 4) | 3180 | 2980 | −6.3 |
| Mode IV K(1; 0) | 1824 | 1744 | −4.4 |
| Mode V K(1; 1) | 2156 | 2130 | −1.2 |
| Mode VI K(1; 2) + I.P. | 3913 | 4057 | 3.7 |

The values reported in the Table show a significant reduction of the intrinsic frequencies of the disc B compared to those of the disc A for the diametrical modes (I, II, III). It shall be noted in particular a decrease of the frequency of the trilobed K(0;3) of 163 Hz (−8.1%), which in the specific case, caused in the disc A the occurrence of particularly severe resonance phenomena. The reduction of the frequency allowed significantly attenuating such phenomena, to the advantage of the running comfort.

The disc for a disc brake of the ventilated type according to the invention allows significantly reducing the occurrence of vibration-associated noises and whistles.

By virtue of the invention, it is possible to increase the dampening mass, so as to decrease the intrinsic frequencies of the disc, thus intervening on the intrinsic frequencies which are mostly responsible for resonance phenomena, without compromising the strength and rigidity of the braking bands.

The presence of the projections arranged along the outer row of the plates further allows increasing the thermal crack strength. Thermal cracks are formed starting from the center, then propagating outwardly the brake disc. The projections, together with the arrangement of the columnar elements, allow creating a hindrance to the growth of the crack itself, locally increase the thickness of the braking band.

Furthermore, the presence of the projections allows increasing the surface available for the thermal exchange, to the advantage of the cooling efficiency of the disc. The arrangement of the projections in the proximity of the outer edge of the plates at the outlet of the ventilation ducts further improves the cooling action.

The presence of the projections in correspondence of the outlet of the ventilation ducts reduces the risk of foreign bodies entering the braking band.

Finally, the disc for a disc brake of the ventilated type according to the invention turns out to be of an easy and economic implementation, being capable of being manufactured by casting, as for the conventional discs.

By virtue of the invention, external components or different from the material composing the braking disc are not used, thereby optimizing the implementation of the disc during the casting without need for further additional operations.

Therefore, the so-devised invention achieves the intended aims.

It shall be apparent that the invention will be able to take, in the practical implementation thereof, also forms and configurations that are different from the one illustrated above, without for this departing from the present protection scope.

Furthermore, all the details will be able to be replaced with technically equivalent elements, and the dimensions, shapes and used materials will be able to be any, according to the needs.

The invention claimed is:

1. Disc for a disc brake of the ventilated type comprising a braking band defined by two plates co-axial to an axis (Z), which are mutually facing and spaced to provide an interspace, said plates having facing surfaces from which connecting elements transversally extend to connect the plates, these facing surfaces defining, together with the connecting elements, inside said interspace, ventilation ducts in order to cool the disc, comprising a plurality of projections protruding from both facing surfaces of the two plates, said projections being circumferentially arranged only in proximity of the outer edges of the plates in correspondence of the outlet of the ventilation ducts, each projection of a plate being opposed to and aligned with a projection of the other plate along a direction parallel to said axis (Z).

2. Disc according to claim 1, wherein said projections are evenly arranged along the outer edges of the plates.

3. Disc according to claim 1, wherein said projections are arranged at the outlet of each ventilation duct.

4. Disc according to claim 1, wherein said projections have a circular section relative to a plane orthogonal to axis (Z).

5. Disc according to claim 1, wherein said connecting elements consist of wings, having a radial development relative to said axis (Z).

6. Disc according to claim 1, wherein said connecting elements consist of columnar elements, which are arranged along at least one outer row and an inner row, which are concentric relative to each other and to the plates.

7. Disc according to claim 6, wherein the columnar elements of the outer row have a substantially circular section relative to a plane orthogonal to the axis Z.

8. Disc according to claim 6, wherein each projection is arranged between two columnar elements of the outer row.

9. Disc according to claim 6, wherein the projections of a plate are in equal number as that of the columnar elements of the outer row.

10. Disc according to claim 6, wherein the columnar elements of the inner row have a rhomboidal-shaped section relative to a plane orthogonal to the axis Z.

11. Disc according to claim 6, wherein at least one further intermediate row of columnar elements is provided.

12. Disc according to claim 11, wherein the columnar elements of the intermediate row are offset relative to those of the outer row and inner row.

13. Disc according to claim 12, wherein said projections are radially aligned with the columnar elements of the intermediate row.

14. Disc according to claim 6, wherein the columnar elements are arranged between the two plates according to a quincuncial arrangement.

15. Disc according to claim 1, wherein said projections are made from the same material as the plates and integral therewith.

* * * * *